(12) United States Patent
Xie

(10) Patent No.: US 8,239,949 B2
(45) Date of Patent: Aug. 7, 2012

(54) MANAGING NETWORK TRAFFIC FLOW

(75) Inventor: Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 134 days.

(21) Appl. No.: 12/403,839

(22) Filed: Mar. 13, 2009

(65) Prior Publication Data

US 2009/0168651 A1 Jul. 2, 2009

Related U.S. Application Data

(63) Continuation of application No. 10/624,941, filed on Jul. 21, 2003, now Pat. No. 7,519,990.

(60) Provisional application No. 60/397,147, filed on Jul. 19, 2002, provisional application No. 60/397,304, filed on Jul. 19, 2002, provisional application No. 60/397,033, filed on Jul. 19, 2002, provisional application No. 60/397,302, filed on Jul. 19, 2002, provisional application No. 60/397,034, filed on Jul. 19, 2002.

(51) Int. Cl.
*G06F 11/00* (2006.01)
(52) U.S. Cl. ............... 726/24; 726/11; 726/22; 726/23
(58) Field of Classification Search ............ 726/22–24, 726/11–14; 370/235; 709/223; 713/151
See application file for complete search history.

(56) References Cited

U.S. PATENT DOCUMENTS

| | | | |
|---|---|---|---|
| 5,491,691 A | 2/1996 | Shtayer et al. | |
| 5,530,939 A | 6/1996 | Mansfield, Jr. et al. | |
| 5,539,659 A | 7/1996 | McKee et al. | |
| 5,557,742 A | 9/1996 | Smaha et al. | |
| 5,790,799 A | 8/1998 | Mogul | |
| 5,892,348 A | 4/1999 | Norman et al. | |
| 5,896,499 A * | 4/1999 | McKelvey | 726/11 |
| 5,946,487 A | 8/1999 | Dangelo | |
| 5,991,881 A | 11/1999 | Conklin et al. | |
| 6,009,467 A | 12/1999 | Ratcliff et al. | |
| 6,067,575 A | 5/2000 | McManis et al. | |
| 6,119,175 A | 9/2000 | Hakkarainen et al. | |
| 6,279,113 B1 | 8/2001 | Vaidya | |
| 6,338,141 B1 | 1/2002 | Wells | |
| 6,453,345 B2 | 9/2002 | Trcka et al. | |
| 6,487,666 B1 | 11/2002 | Shanklin et al. | |
| 6,513,122 B1 | 1/2003 | Magdych et al. | |

(Continued)

OTHER PUBLICATIONS

"U.S. Appl. No. 10/624,452, Final Office Action Mailed Oct. 17, 2008", FOAR, 2pgs.

(Continued)

*Primary Examiner* — Samson Lemma
(74) *Attorney, Agent, or Firm* — Schwegman, Lundberg & Woessner, P.A.

(57) ABSTRACT

A method for managing network traffic flow is provided. The method includes receiving network traffic content, storing at least a portion of the network traffic content to a memory, sending a copy of the network traffic content to a processor, which determines whether the network traffic content contains content desired to be detected. Another method for managing network traffic flow includes receiving network traffic content, flagging the network traffic content, sending the flagged network traffic content to a module, which is configured to pass unflagged data to a user and prevent flagged data from being sent to the user, and sending a copy of the network traffic content to a processor, which determines whether the network traffic content contains content desired to be detected.

14 Claims, 8 Drawing Sheets

U.S. PATENT DOCUMENTS

| | | | |
|---|---|---|---|
| 6,519,703 B1 | 2/2003 | Joyce | |
| 6,637,026 B1 | 10/2003 | Chen | |
| 6,654,373 B1 * | 11/2003 | Maher et al. | 370/392 |
| 6,654,882 B1 | 11/2003 | Froutan et al. | |
| 6,823,697 B2 | 11/2004 | Fukuyama et al. | |
| 6,826,697 B1 | 11/2004 | Moran | |
| 7,047,288 B2 | 5/2006 | Cooper | |
| 7,080,408 B1 | 7/2006 | Pak et al. | |
| 7,134,012 B2 * | 11/2006 | Doyle et al. | 713/151 |
| 7,181,765 B2 | 2/2007 | Patel et al. | |
| 7,181,769 B1 | 2/2007 | Kianini et al. | |
| 7,185,368 B2 | 2/2007 | Copeland, III | |
| 7,243,371 B1 | 7/2007 | Kasper et al. | |
| 7,424,744 B1 | 9/2008 | Wu et al. | |
| 7,519,990 B1 | 4/2009 | Xie et al. | |
| 7,519,990 C1 | 5/2011 | Xie | |
| 8,140,660 B1 | 3/2012 | Wells et al. | |
| 2001/0042214 A1 | 11/2001 | Radatti et al. | |
| 2002/0038339 A1 * | 3/2002 | Xu | 709/203 |
| 2002/0094090 A1 | 7/2002 | Iino | |
| 2002/0129271 A1 * | 9/2002 | Stanaway et al. | 713/201 |
| 2002/0162026 A1 * | 10/2002 | Neuman et al. | 713/201 |
| 2002/0174350 A1 * | 11/2002 | Franczek et al. | 713/188 |
| 2002/0188839 A1 | 12/2002 | Noehring | |
| 2003/0004689 A1 | 1/2003 | Gupta et al. | |
| 2003/0014662 A1 | 1/2003 | Gupta et al. | |
| 2003/0061496 A1 | 3/2003 | Ananda | |
| 2003/0145228 A1 | 7/2003 | Suuronen et al. | |
| 2004/0003284 A1 | 1/2004 | Campbell et al. | |
| 2005/0021613 A1 | 1/2005 | Schmeidler et al. | |
| 2005/0251570 A1 | 11/2005 | Heasman et al. | |

OTHER PUBLICATIONS

"U.S. Appl. No. 10/624,452, Response filed Jan. 21, 2009 to Final Office Action Mailed Oct. 17, 2008", 11 pgs.

"U.S. Appl. No. 10/624,452, Response filed Jul. 30, 2008 to Non-Final Office Action mailed Apr. 30, 2008", 10 pgs.

"U.S. Appl. No. 10/624,452, Non-Final Office Action mailed Mar. 4, 2009", 3 pgs.

"U.S. Appl. No. 10/624,914 Final Office Action mailed Jul. 10, 2008", FOAR, 17 PgS.

"U.S. Appl. No. 10/624,941 Notice of Allowance mailed Feb. 25, 2009", NOAR, 4 pgs.

"U.S. Appl. No. 10/624,941 Response filed Jul. 16, 2008 to Non-Final Office Action mailed Mar. 17, 2008", 9 pgs.

"U.S. Appl. No. 10/624,941, Non-Final Office Action mailed Dec. 11, 2008", 6 pgs.

"U.S. Appl. No. 10/624,941, Response filed Jan. 14, 2009 to Non-Final Office Action mailed Dec. 11, 2008", 11 pgs.

"U.S. Appl. No. 10/624,452, Non-Final Office Action mailed Apr. 28, 2010", 16 pgs.

"U.S. Appl. No. 10/624,452, Advisory Action mailed Dec. 17, 2007", 3 pgs.

"U.S. Appl. No. 10/624,452, Final Office Action mailed Oct. 1, 2009", 9 pgs.

"U.S. Appl. No. 10/624,452, Final Office Action mailed Oct. 3, 2007", 18 pgs.

"U.S. Appl. No. 10/624,452, Non-Final Office Action mailed Apr. 18, 2007", 13 pgs.

"U.S. Appl. No. 10/624,452, Non-Final Office Action mailed Apr. 30, 2008", 14 pgs.

"U.S. Appl. No. 10/624,452, Preliminar Amendment mailed Apr. 26, 2005", 3 pgs.

"U.S. Appl. No. 10/624,452, Preliminary Amendment mailed Aug. 27, 2003", 3 pgs.

"U.S. Appl. No. 10/624,452, Response filed Mar. 1, 2010 to Final Office Action mailed Oct. 1, 2009", 12 pgs.

"U.S. Appl. No. 10/624,452, Response filed Jun. 2, 2009 to Non Final Office Action mailed Mar. 4, 2009", 12 pgs.

"U.S. Appl. No. 10/624,452, Response filed Jul. 18, 2007 to Non-Final Office Action Apr. 18, 2007", 15 pgs.

"U.S. Appl. No. 10/624,452, Response filed Aug. 30, 2010 to Non Final Office Action mailed Apr. 28, 2010", 12 pgs.

"U.S. Appl. No. 10/624,452, Response filed Dec. 3, 2007 to Final Office Action Oct. 3, 2007", 15 pgs.

"U.S. Appl. No. 10/624,914 Non-Final Office Action mailed Jun. 24, 2009", 2 pgs.

"U.S. Appl. No. 10/624,914, Advisory Action mailed Oct. 19, 2007", 3 pgs.

"U.S. Appl. No. 10/624,914, Final Office Action mailed Mar. 31, 2010", 12 pgs.

"U.S. Appl. No. 10/624,914, Final Office Action mailed Aug. 10, 2007", 17 pgs.

"U.S. Appl. No. 10/624,914, Non-Final Office Action mailed Jan. 2, 2008", 17 pgs.

"U.S. Appl. No. 10/624,914, Non-Final Office Action mailed Mar. 14, 2007", 10 pgs.

"U.S. Appl. No. 10/624,914, Preliminary Amendment mailed Apr. 26, 2005", 5 pgs.

"U.S. Appl. No. 10/624,914, Response filed Apr. 2, 2008 to Non-Final Office Action mailed Jan. 2, 2008", 15 pgs.

"U.S. Appl. No. 10/624,914, Response filed Jun. 14, 2007 to Non-Final Office Action mailed Mar. 14, 2007", 11 pgs.

"U.S. Appl. No. 10/624,914, Response filed Aug. 30, 2010 to Final Office Action mailed Mar. 31, 2010", 8 pgs.

"U.S. Appl. No. 10/624,914, Response filed Sep. 24, 2007 to Final Office Action mailed Aug. 10, 2007", 12 pgs.

"U.S. Appl. No. 10/624,914, Response filed Dec. 17, 2009 to Non Final Office Action mailed Jun. 24, 2009", 7 pgs.

"U.S. Appl. No. 10/624,941, Advisory Action mailed Aug. 29, 2007", 3 pgs.

"U.S. Appl. No. 10/624,941, Final Office Action mailed Jun. 11, 2007", 12 pgs.

"U.S. Appl. No. 10/624,941, Non-Final Office Action mailed Mar. 17, 2006", 15 pgs.

"U.S. Appl. No. 10/624,941, Non-Final Office Action mailed Oct. 3, 2007", 16 pgs.

"U.S. Appl. No. 10/624,941, Non-Final Office Action mailed Oct. 17, 2006", 11 pgs.

"U.S. Appl. No. 10/624,941, Preliminary Amendment mailed Apr. 26, 2005", 3 pgs.

"U.S. Appl. No. 10/624,941, Preliminary Amendment mailed Aug. 27, 2003", 3 pgs.

"U.S. Appl. No. 10/624,941, Response filed Feb. 20, 2007 to Non-Final Office Action mailed Oct. 17, 2006", 11 pgs.

"U.S. Appl. No. 10/624,941, Response filed Aug. 13, 2007 to Final Office Action mailed Jun. 11, 2007", 10 pgs.

"U.S. Appl. No. 10/624,941, Response filed Dec. 14, 2007 to Non-Final Office Action mailed Oct. 3, 2007", 11 pgs.

"U.S. Appl. No. 10/624,948, Final Office Action mailed Jun. 1, 2010", 14 pgs.

"U.S. Appl. No. 10/624,948, Non-Final Office Action mailed Feb. 8, 2010", 15 pgs.

"U.S. Appl. No. 10/624,948, Non-Final Office Action mailed Mar. 30, 2007", 5 pgs.

"U.S. Appl. No. 10/624,948, Notice of Allowance Aug. 8, 2007", 4 pgs.

"U.S. Appl. No. 10/624,948, Preliminary Amendment mailed Apr. 26, 2005", 3 pgs.

"U.S. Appl. No. 10/624,948, Preliminary Amendment mailed Aug. 27, 2003", 3 pgs.

"U.S. Appl. No. 10/624,948, Response filed May 10, 2010 to Non Final Office Action mailed Feb. 8, 2010", 25 pgs.

"U.S. Appl. No. 10/624,948, Response filed May 18, 2007 to Non-Final Office Action mailed Mar. 30, 2007", 30 pgs.

"U.S. Appl. No. 10/624,948, Response filed Sep. 1, 2010 to Final Office Action mailed Jun. 1, 2010", 26 pgs.

"U.S. Appl. No. 10/624,452, Final Office Office Action mailed Nov. 17, 2010", 17 pgs.

"U.S. Appl. No. 10/624,914, Non Final Office Action mailed Mar. 3, 2011", 13 pgs.

"U.S. Appl. No. 10/624,948, Non-Final Office Action mailed Oct. 14, 2010", 3 pgs.

"Application Serial No. 90/010,939, Ex-Parte Re-examination Office Action Mailed Nov. 5, 2010", 16 pgs.

"U.S. Appl. No. 10/624,452, Response filed Jul. 13, 2011 to Final Office Action mailed Jul. 17, 2010", 9 pgs.

"U.S. Appl. No. 10/624,914, Final Office Action mailed Aug. 18, 2011", 17 pgs.

"U.S. Appl. No. 10/624,914, Response filed Jun. 3, 2011 to Non Final Office Action mailed Mar. 3, 2011", 8 pgs.

"U.S. Appl. No. 10/624,914, Response Filed Jun. 3, 2011 to Non-Final Office Action", 8 pgs.

"U.S. Appl. No. 10/624,948, Final Office Action mailed May 2, 2011", 18 pgs.

"U.S. Appl. No. 10/624,948, Response filed Apr. 8, 2011 to Non-Final Office Action", 27 pgs.

"U.S. Appl. No. 10/624,452, Notice of Allowance mailed Nov. 10, 2011", 15 pgs.

"U.S. Appl. No. 10/624,914, Response Filed Dec. 19, 2011 to Non-Final Office Action", 9 pgs.

"U.S. Appl. No. 10/624,948, Response filed Feb. 27, 2012 to Non Final Office Action mailed Oct. 25, 2011", 25 pgs.

"U.S. Appl. No. 10/624,948, Non Final Office Action mailed Oct. 25, 2011", 16 pgs.

"U.S. Appl. No. 10/624,948, Response Filed Oct. 3, 2011 to Final Office ACtion", 24 pgs.

* cited by examiner

| ID | RETURN | PREDICATE | MNEMONIC | FAMILY | DESCRIPTION |
|---|---|---|---|---|---|
| A | B | A(Z) | ASCII | TEST | TEST LITERAL STRING |
| B | B | B(M) | BITMASK | TEST | TEST USING BITMASK |
| C | V | C() | CASE | DECISION | BRANCH USING MULTIPLE CASES |
| D | V | D(LABEL) | DO | ITERATION | START LOOP (ENDS ON LABEL) |
| E | V | E(F,B,B,...) | EACH | ITERATION | REPEAT FUNCTION WITH EACH BYTE IN LIST |
| F | V | F(N, F) | FOR | ITERATION | REPEAT FUNCTION ON N BUFFER BYTES |
| G | V | G(LABEL) | GOTO | DECISION | GOTO LABEL IN SIG |
| H | B | H(D) | HEURISTIC | TEST | TEST D AGAINST HEURISTIC FLAGS |
| I | V | I(F, L) | IF | DECISION | IF TEST F BRANCH ELSE CONTINUE |
| J | V | J(SIZE) | JUMP | POINTER | JUMP USING BUFFER VALUE OF SIZE |
| K | B | K(RESERVED) | KEYWORD | FUNCTION | PROCESS KEYWORD |
| L | B | L(B) | LITERAL | TEST | TEST LITERAL |
| M | V | M(NAME) | MACRO | FUNCTION | EXECUTE MACRO NAME |
| N | B | N(LOGIC) | NEAR | TEST | TESTING USING RELATIVE LOGIC |
| O | B | O(N, METHOD) | ORDER | TEST | ORDER (SORT) N BUFFER BYTES USING METHOD |
| P | V | P(NAME) | PROCESS/PROCEDURE | FUNCTION | EXECUTE PROCESS NAME |
| Q | B | Q(LOGIC) | QUERY | TEST | TEST USING RANGED LOGIC |
| R | V | R(P) | REWIND | POINTER | RESET BUFFER STREAM POINTER |
| S | B | S(N,K) | SEEK | POINTER | REPOSITION BUFFER STREAM POINTER |
| T | B | T(LOGIC) | TEST | TEST | TEST USING POSITIONAL LOGIC |
| U | B | U(Z) | UPPERCASE | TEST | TEST AFTER UPPERCASING BUFFER STRING |
| V | B | V(LOGIC) | VARIABLE | TEST | TEST USING SET SUMMATION |
| W | B | W(C) | WILDCARD | TEST | SIMPLY (ONE BYTE) WILDCARDS |
| X | B | X(B) | XRAY/XOR | TEST | TEST USING XOR MASK BASED ON B |

FIG. 5

MANAGING NETWORK TRAFFIC FLOW

RELATED APPLICATION DATA

This application is a Continuation of U.S. application Ser. No. 10/624,941, filed on Jul. 21, 2003 now U.S. Pat. No. 7,519,990, which claims priority to U.S. Provisional Application No. 60/397,147, filed on Jul. 19, 2002, to U.S. Provisional Application No. 60/397,304, filed on Jul. 19, 2002, to U.S. Provisional Application No. 60/397,033, filed on Jul. 19, 2002, to U.S. Provisional Application No. 60/397,302, filed Jul. 19, 2002, and to U.S. Provisional Application No. 60/397,034, filed on Jul. 19, 2002, which applications are expressly incorporated by reference herein in their entirety.

BACKGROUND OF THE INVENTION

1. Field of the Invention

The field of the invention relates to computer systems and computer networks, and more particularly, to systems and methods for detecting content of computer and network traffic.

2. Background of the Invention

The generation and spreading of computer viruses are major problems in computer systems and computer networks. A computer virus is a program that is capable of attaching to other programs or sets of computer instructions, replicating itself, and/or performing unsolicited or malicious actions on a computer system. Viruses may be embedded in email attachments, files downloaded from Internet, and macros in MS Office files. The damage that can be done by a computer virus may range from mild interference with a program, such as a display of unsolicited messages or graphics, to complete destruction of data on a user's hard drive or server.

To provide protection from viruses, most organizations have installed virus scanning software on computers in their network. However, these organizations may still be vulnerable to a virus attack until every host in their network has received updated anti-virus software. With new attacks reported almost weekly, organizations are constantly exposed to virus attacks, and spend significant resources ensuring that all hosts are constantly updated with new anti-virus information. Furthermore, anti-virus programs that operate at the application-level require enormous computing resources, making such anti-virus programs expensive to deploy and manage.

Besides virus attacks, many organizations also face the challenge of dealing with inappropriate content, such as email spam, misuse of networks in the form of browsing or downloading inappropriate content, and use of the network for non-productive tasks. Many organizations are struggling to control access to appropriate content without unduly restricting access to legitimate material and services. Currently, the most popular solution for blocking unwanted web activity is to block access to a list of banned or blacklisted web sites and pages based on their URLs. However, such approach may be unnecessarily restrictive, preventing access to valid content in web sites that may contain only a limited amount of undesirable material. As with virus scanning, the list of blocked URLs requires constant updating.

Many email spam elimination systems also use blacklists to eliminate unwanted email messages. These systems match incoming email messages against a list of mail servers that have been pre-identified to be spam hosts, and prevent user access of messages from these servers. However, spammers often launch email spam from different hosts every time, making it difficult to maintain a list of spam servers.

Accordingly, improved systems and methods for detecting content of computer and network traffic would be useful.

SUMMARY OF THE INVENTION

In some embodiments of the invention, a method for managing network traffic flow includes receiving network traffic content, determining whether a protocol of the network traffic content matches with a prescribed protocol of network traffic content that could contain content desired to be detected, and storing the network traffic content in a stack when the protocol of the network traffic content matches the prescribed protocol.

In other embodiments of the invention, a method for managing network traffic flow includes receiving network traffic content, storing at least a portion of the network traffic content to a memory, and sending a copy of the network traffic content to a processor, which determines whether the network traffic content contains content desired to be detected.

In other embodiments of the invention, a method for managing network traffic flow includes receiving network traffic content, flagging the network traffic content, sending the flagged network traffic content to a module, which is configured to pass unflagged data to a user and prevent flagged data from being sent to the user, and sending a copy of the network traffic content to a processor, which determines whether the network traffic content contains content desired to be detected.

Other aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting its scope, the invention will be described and explained with additional specificity and detail through the use of the accompanying drawings.

FIG. 5 is a table listing examples of predicate that may be used to control a logic of processor of FIG. 2;

DETAILED DESCRIPTION OF THE PREFERRED EMBODIMENTS

Figure 1:
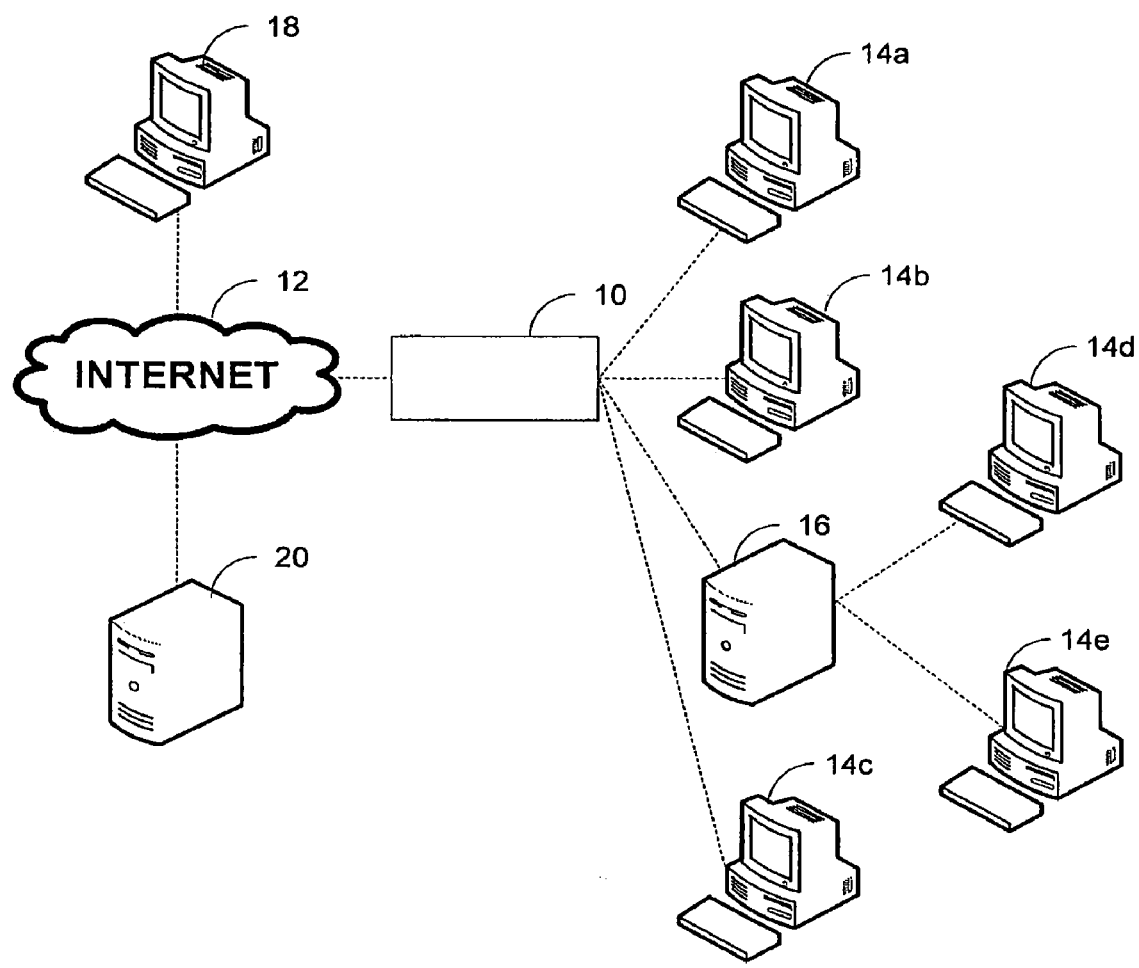
FIG. 1 illustrates a detection device in accordance with some embodiments of the invention, and an example of a network environment in which detection device can be operated.

Various embodiments of the present invention are described hereinafter with reference to the figures. It should be noted that the figures are not drawn to scale and that elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an illustrated embodiment needs not have all the aspects or advantages of the invention shown. An aspect or an advantage described in conjunction with a particular embodiment of the present invention is not necessarily limited to that embodiment and can be practiced in any other embodiments of the present invention even if not so illustrated.

FIG. 1 illustrates a detection device 10 in accordance with embodiments of the present invention, and an example of a network environment in which detection device 10 can be operated. Detection device 10 is configured to detect a program content, such as a virus, and/or a non-program content, such as a web content, being transmitted from Internet 12 to users 14a-e. For example, a sender 18 connected to Internet 12 may send files containing viruses, worms, or other malicious programs, to one or more of the users 14a-c and server 16 via Internet 12. Viruses may also be copied from a server 20 and transmitted to users 14a-c and network server 16 through Internet 12. Viruses transmitted to network server 16 may also infect users 14d and 14e connected to network server 16. Detection device 10 scans network traffic content transmitted from Internet 12 and prevents undesirable content, such as a virus, a worm, an email spam, and a web page containing undesirable content, from being transmitted to users 14a-e. Besides detecting content, detection device 10 may also modify or re-direct network traffic content such that, for examples, a virus may be removed from a network stream, or a HTTP request may be blocked. In some embodiments, detection device 10 may be implemented as a firewall, a component of a firewall, or a component that is configured to be coupled to a firewall.

Figure 2:
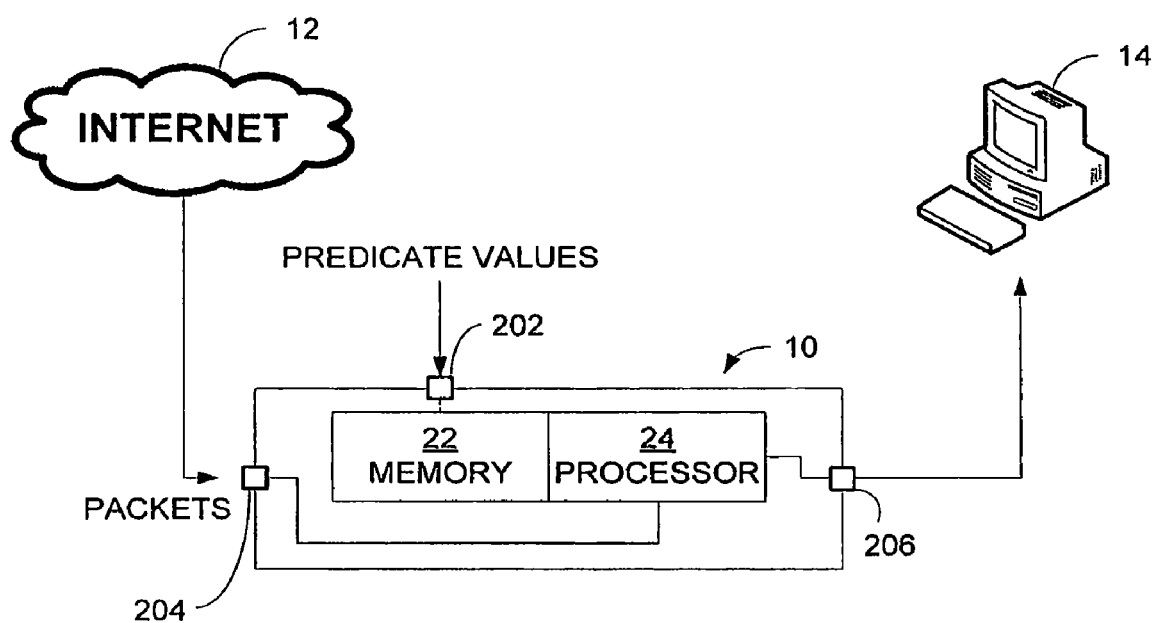
FIG. 2 illustrates a block diagram of detection device of FIG. 1.

FIG. 2 shows content detection device 10 of FIG. 1 in further detail. As shown in FIG. 2, detection device 10 includes a memory 22 and a processor 24 coupled to memory 22. Detection device 10 also includes a first input port 202 for inputting data to memory 22, a second input port 204 for receiving network traffic packets from Internet 12 or a network, and an output port 206 coupled to processor 24. Output port 206 is configured for transmitting filtered network traffic packets to user 14. In alternative embodiments, memory 22 can be implemented as a part of processor 24.

Memory 22 is adapted for storing data to be processed by processor 24. Data may be transmitted to memory 22 via input port 202 from a user or an administrator. For example, a user or an administrator can transmit data to memory 22 via a wire, a telephone line, a T1-line, a cable of a cable modem, or other types of transmitter connected to port 202. Data may also be transmitted to memory 22 via an infrared transmitter, in which case, port 202 would include an infrared receiver. In the illustrated embodiments, memory 22 is adapted for storing one or more signatures, each of which associated with content desired to be detected by detection device 10. The signatures will be described in detail below.

In the illustrated embodiments, the processor 24 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. Processor 24 is configured to receive packets from Internet 12, process packets based on data stored in memory 22, and generate a result based on the processing of the packets. It should be noted that processor 24 is not limited to those described previously, and that processor 24 can also be any of a variety of circuits or devices that are capable of performing the functions described herein. For example, in alternative embodiments, processor 24 can include a general purpose processor, such as a Pentium processor.

Figure 3:
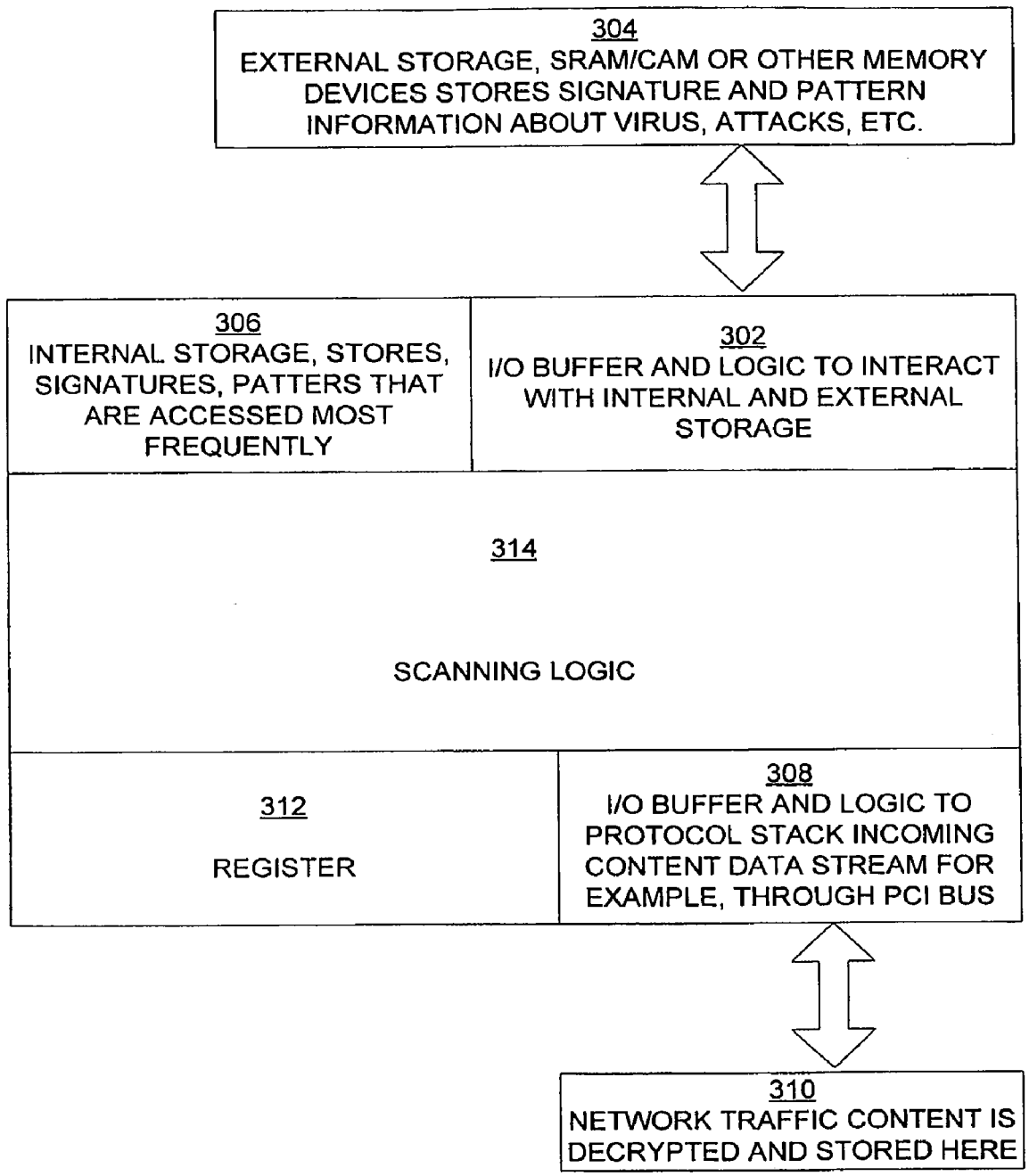
FIG. 3 illustrates an architecture of the processor of detection device of FIG. 2.

FIG. 3 shows an architecture of processor 24 in accordance with some embodiments of the present invention. Processor 24 includes a first I/O buffer and logic 302, an internal storage 306, a second I/O buffer and logic 308, a register 312, and a scanning logic 314. I/O buffer and logic 302 is configured for processing data (e.g., information associated with content desired to be detected) received from an external memory 304 such that data of desirable format can be stored in internal storage 306. I/O buffer and logic 308 is configured for processing decrypted network traffic content received from an external memory 310 (such as a RAM) such that data of desirable format can be stored in register 312. In some embodiments of the invention, one or both of I/O buffer and logics 302 and 308 can also process data generated by scanning logic 314 such that data of desirable format can be transmitted to external storages 304 and 310, respectively. Scanning logic 314 processes network traffic content stored in register 312 base on data stored in internal memory 306, and determines whether network traffic content contains content desired to be detected. In the illustrated embodiments of the invention, I/O buffer and logics 302, 308, and scanning logic 314 are implemented in processor 24. In alternative embodiments, separate processors or components may be used to implement buffer and logics 302 and 308 and scanning logic 314. In addition, internal storage 306 and register 312 can both be implemented using a single memory, such as memory 22. In alternative embodiments, internal storage 306 and register 312 can each be implemented using a separate memory.

Figure 4:
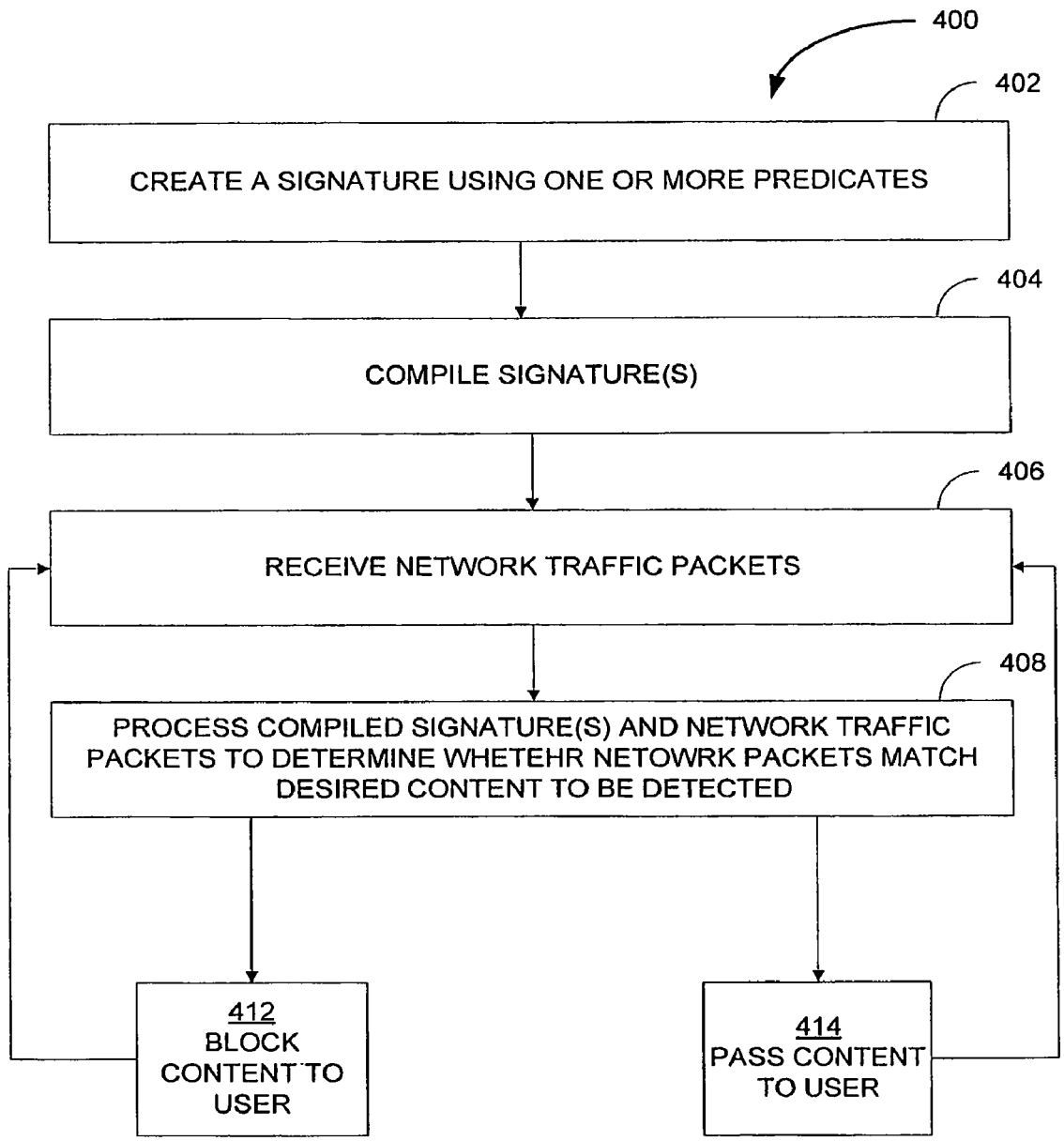
FIG. 4 is a flow chart showing a process for detecting content of network traffic.

A method 400 for detecting network traffic content using detection device 10 will now be described with reference to FIG. 4. Initially, content pattern recognition language (CPRL) is used to create a signature, which represents a symbolic detection model for certain prescribed content, such as a virus, a worm, a web content, a Trogent agent, an email spam, a packet transmitted by a hacker, etc., desired to be detected (Step 402). Depending on an implementation of the CPRL, in some embodiments of the invention, the signature may be expressed in a form similar to a set of sentences or phrases in predicate logic. The pattern recognition signature created for a given content desired to be detected is tested for validity, compiled, and interpreted by a set of functions implemented using processor 24. In some embodiments of the invention, the CPRL used is a programming language that supports testing, branching, looping, and/or recursion.

FIG. 5 is a table showing examples of predicates that can be used to create a signature of content desired to be detected.

Column 502 shows identifications of predicates that are the basic roots or components of a CPRL. Although only identifications "A" through "X" are shown, in alternative embodiments, a predicate identification can also includes other letters, a number, a combination of letters, mathematical operator, logical operator, punctuations, and/or combination thereof. Column 506 shows mnemonics represented by respective predicates.

Column 504 shows formats in which predicates A-Z are used. For examples, predicate "D" has "label" as its argument, and predicate "M" has "name" as its argument. In some embodiments, the argument of a predicate may include one or a combination of bytes, with each of the bytes having two characters. In alternative embodiments, the argument can also include a number, a letter, a combination of letters, a sentence, a mathematical operator, a logical operator, a punctuation, and/or combination thereof. In other embodiments, a predicate may not require an argument.

In the illustrated embodiments, each predicate of a signature is compiled into a byte stream that controls a logic of processor 24. Column 510 describes functions that are performed by processor 24 based on respective predicates. Appendix A provides exemplary specifications for the predicates illustrated in FIG. 5. It should be understood by those skilled in the art that the functions prescribed by the predicates should not be limited to the examples shown in FIG. 5, and that other functions may also be prescribed to be performed by processor 24 based on other predicates. Each function prescribed by the respective predicate may return a variable, such as a Boolean value, a number, a pointer, a "void", or other types of return value (Column 512).

The predicates may be categorized by the types of function they perform (Column 508). In the illustrated embodiments, CPRL includes five families of predicates, namely, "Test", "Decision", "Iteration", "Function", and "Pointer". A "test" type predicate provides instruction that causes processor 24 to test one or more variables using a prescribed operation. A "decision" type predicate provides instruction that causes processor 24 to decide which operation to perform based on a prescribed condition. An "iteration" type predicate provides instruction that causes processor 24 to repeat a prescribed function. A "function" type predicate provides instruction that causes the processor 24 to execute a prescribed function. A "pointer" type predicate provides instruction that causes processor 24 to position or reset a buffer stream pointer. Although five types of predicates are shown, in alternative embodiments, CPRL may have other different types of predicates.

Like predicate logic, the signature codified using CPRL is treated as a formula made up of logical elements and is rule-based. Accordingly, each signature must meet these rules in order to form a well-formed formula (wff). Codifying signature using a predicate-based system is advantageous in that the codified signature is much more readable and intuitive than memorizing and using an extensive collection of pattern recognition directives in a form of hexadecimal code instructions embedded in a signature stream. In some embodiments, the predicates can be formalized such that they are similar to inline macros, thereby allowing a user to easily create signatures without having to learn a completely new set of programming language.

Unlike traditional virus signatures, which are used to detect virus using byte-by-byte comparison, a signature created using CPRL represent one or more instructions that control an operation of a processor being used to detect content. For examples, a signature created using CPRL may provide instructions for calling functions, pointing to a different signature, calling an interpreter of the signature recursively, responding to a returned information, and/or performing other functions. As such, CPRL is a true pattern recognition language, and is far more powerful then traditional antivirus signatures. It should be understood by those skilled in the art that the scope of the invention is not limited to the examples of CPRL described previously, and that other languages or symbolic models may also be used to codify signatures.

The signature(s) may be codified by one or more service providers. For example, when a new virus is discovered, a service provider may codify the corresponding signature and send the signature to the detection device 10 as an update. Alternatively, or additionally, one or more users may also codify the signature if a new virus is discovered. The codifying of the signature(s) may be performed on a computer platform. For example, a suitable editor may be used for writing and/or editing the signature(s). In some embodiments, an integrated development environment (IDE) may be employed for writing and/or editing the signature(s). A graphical interface may also be used to assist writing and/or editing the signature(s). The signature, (i.e., resulting code) may be stored in a computer-readable medium for future processing.

Returning to FIG. 4, the signature is next compiled into a byte stream or machine language such that the signature can be processed by processor 24, and the compiled data is stored within a memory of detection device 10 (Step 404). The compiling of the signature may be performed by a suitable compiler. In some embodiments, after the signature is compiled, the compiled code (e.g., in a form of byte streams) is transmitted to memory 22 of detection device 10 via a telephone line, a T1-line, a wireless transmitter, etc. In such case, internal storage 306 may be used to store signatures that are processed the most frequent. In other embodiments, instead of storing the compiled code in memory 22, the compiled code is stored in a separate memory. In such case, memory 22 may be used to store signatures that are processed the most frequent.

Figure 6:
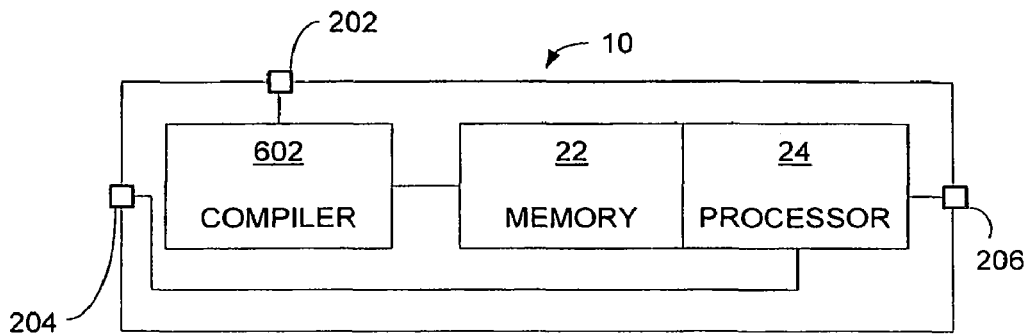
FIG. 6 illustrates a block diagram of a detection device in accordance with alternative embodiments of the invention, particularly showing detection device including a compiler.

In the illustrated embodiments, the compiling is performed by a compiler that is not a part of detection device 10. In alternative embodiments, the detection device 10 may include a compiler 602 for compiling the signature (FIG. 6). In such case, the signature, in its un-compiled form, may be stored within memory 22 of the detection device 10, and the compiled signature may be stored in internal storage 306, in memory 22, or another separate memory of detection device 10.

Next, detection device 10 receives network traffic packets to be screened (Step 406). For examples, web content, emails, and other data transmitted through a network may be decrypted and converted into packets, which are then sent to processor 24 of detection device 10 via input port 204 for processing. I/O buffer and logic 308 may be used to translate decrypted network traffic content into a format such that the decrypted network traffic content can be processed by processor 24. In some embodiments, processor 24 may receive a plurality of sessions (of network traffic) concurrently. In such case, processor 24 may execute one or more instruction on a first session, execute one or more instruction on a second session, and then switch back and execute additional instruction on the first session.

Based on the compiled signatures, processor 24 executes one or more functions to determine whether the network traffic content matches the content desired to be detected (Step 408). For example, processor 24 may execute scanning logic 314 based on one or more instructions prescribed by a CPRL signature, and determine whether the network traffic content matches or is associated with the content desired to be detected.

Processor 24 may detect a variety of contents based on instructions prescribed by CPRL signatures. For example, a signature may provide instruction that causes processor 24 to perform worm scanning. When configured to perform worm scanning, processor 24 may scan HTTP requests by scanning their originating web page for known viral patterns such as Code Red, which is programmed to gain entry to a server. To scan email attachments for worms, processor 24 may look for filenames, such as readme.exe and sample.exe, known to be used by worms.

In other embodiments, based on instructions prescribed by CPRL signatures, processor 24 may also detect virus by performing signature scanning, macro scanning, and heuristic scanning (e.g., static heuristic scanning or dynamic heuristic scanning). To perform signature scanning, processor 24 may scan target file for byte-strings that are known to identify viruses. If all of the byte strings for a particular virus are matched, the virus is considered present in the file. To perform macro scanning, processor 24 may extract one or more macros from MS Office file and scan them for known macro virus strings. Processor 24 may also analyze macros for peculiar behavior such as importing code, exporting code, writing to a registry, and/or attempting to disable a security feature. If any of the macro tests produces a positive result, a macro virus is deemed present in the MS Office file. To perform heuristic scanning, processor 24 may scan files for known byte strings that indicate a presence of a virus. For example, in the program byte, "B4 09 BA 20 01 CD 21 B8 02 3D BA 12 34 CD 21 CC B8 FF 4C CD 21", processor 24 can match the signature, "B8 02 3D BA ?? ?? CD 21" (representing a program that opens a file), and the signature, "B8 ?? 4C CD 21" (representing a program that terminates itself).

In other embodiments, based on instructions prescribed by CPRL signatures, processor 24 may also detect a hacking of a computer system. For example, a CPRL signature may provide one or more instructions to processor 24 that causes processor to detect a SYN packet, which may be sent by a hacker to determine which ports of a gateway are opened. It should be understood by those skilled in the art that the types of content that can be detected by processor 24 are not limited to those discussed previously, and that other types of content, such as a web content, an email spam, a Trogent agent, or other undesirable content may also be detected by controlling the logic of processor 24 using a CPRL signature.

In further embodiments of the invention, processor 24 may also search for a variety of target files, such as files that may be executable (e.g., .exe, .bat, and .com), visual basic files (.vbs), compressed files (.zip, .gzip, tar, .hta, and .rar), screen saver files (.scr), dynamic link libraries (.dll), MS Office files, or other types of files. Processor 24 may also be configured such that it is capable to parse Multipurpose Internet Mail Extensions (MIME) files to find target file(s). In alternative embodiments, a separate processor, such as a general purpose processor may be used to search for target files that may contain content desired to be detected. The target files are then transmitted to processor 24, which determines whether the target files contain content desired to be detected.

If it is determined that network traffic content matches with content desired to be detected, processor 24 then prevents such network traffic content from being transmitted to users (Step 412). In some embodiments of the invention, processor 24 may cause a message to be sent to a user, notifying the user that a prescribed content has been detected. In other embodiments of the invention, processor 24 may cause a detected content to be erased, or remove undesirable portion(s) of the network traffic content before transmitting it to a user.

If it is determined network traffic content does not match with content desired to be detected, processor 24 then passes such content to a user (Step 414).

Figure 7:
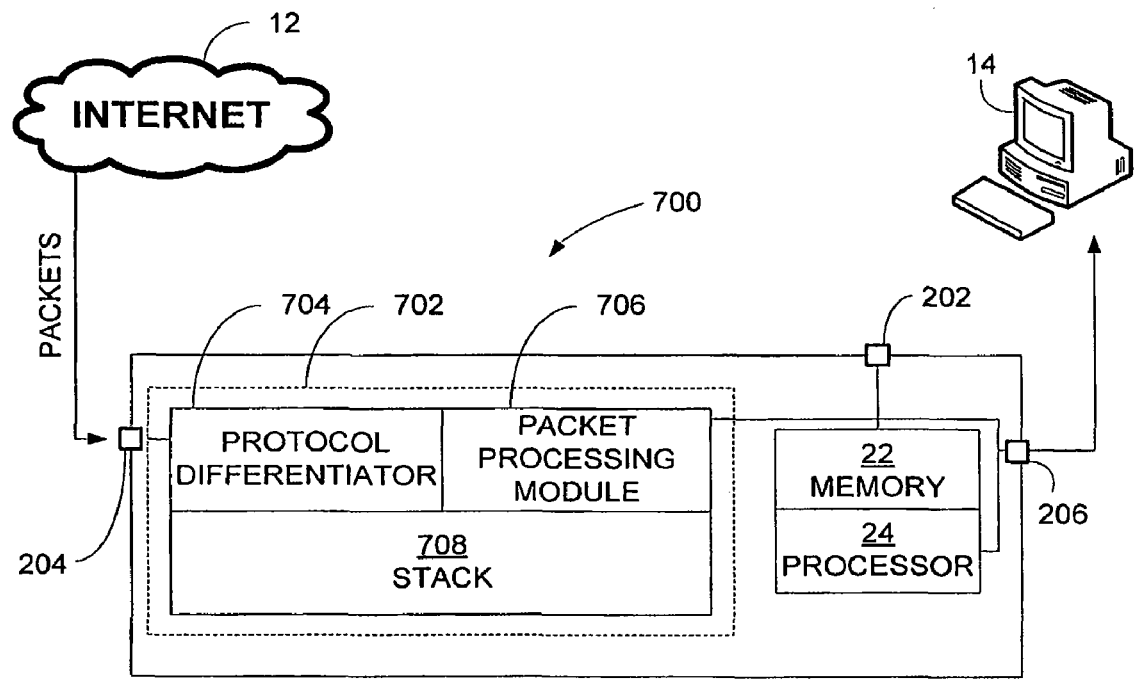
FIG. 7 illustrates a block diagram of another detection device in accordance with alternative embodiments of the invention, particularly showing the detection device including a processor configured for managing network traffic flow.

FIG. 7 shows detection device 700 in accordance with alternative embodiments of the invention. As shown in FIG. 7, in addition to memory 22 and processor 24, detection device 700 also includes a second processor 702 (network traffic management module) configured for managing network traffic flow. Processor 702 includes a protocol differentiator 704 for determining the types of content being screened, a packet processing module 706 that performs basic functions of a network gateway, and a stack 708 for receiving data to be processed by processor 24. In some embodiments, stack 708 may convert network traffic content into content stream that can be processed by processor 24. Processor 702 can be a Pentium processor, a Motorola processor, or other processor capable of performing the functions described herein. In the illustrated embodiments, stack 708 is a program that is implemented in processor 702. In alternative embodiments, stack 708 is a program that is implemented in processor 24, or in both processors 24 and 702. In other embodiments of the invention, stack 708 can be a device, such as a memory device, that is a part of processor 24 or 702. In alternative embodiments, stack 708 can also be a separate device coupled to processor 702 or to processor 24. In such case, processor 702 or processor 24 does not include stack 708. In further embodiments of the invention, processor 24 and processor 702 may be implemented using a single processor.

During use, network traffic is sent to processor 702 via port 204. Protocol differentiator 704 examines headers of the network traffic and determines the types of content being screened. In some embodiments of the invention, each type of network traffic content is pre-assigned to a port of a network gateway by a default configuration. For example, HTTP, SMTP, POP, IMAP, and FTP data may each be pre-assigned to be transmitted through a designated port. In such case, protocol differentiator 704 can determine a type of content based on an identification of a port transmitting the network content. In other embodiments of the invention, protocol differentiator 704 can be configured to scan all available ports in order to determine a type of the network traffic content being screened.

Next, depending on the type of content received or the content protocol, protocol differentiator 704 passes network traffic data to either packet processing module 706 or stack 708. For example, certain types of network traffic content, such as DNS data or telnet data, may be considered as "safe" traffic content, while other types of network traffic content, such as HTTP content or emails, may be considered as "unsafe" traffic content (i.e., content that may contain virus, worms, or undesirable material). In the illustrated embodiments, protocol differentiator 704 is configured to pass safe traffic content to packet processing module 706, and unsafe traffic content to stack 708. In alternative embodiments, protocol differentiator 704 is configured to pass potentially undesirable network traffic content to both packet processing module 706 and stack 708. In such case, network traffic content that can be screened by conventional content filtering techniques may be passed to packet processing module 706, while other network traffic content, such as those that may contain virus or worms, may be passed to stack 708. In some embodiments of the invention, processor 702 may be programmable or configurable such that a user can prescribe certain types of network traffic content to be passed to packet processing module 706 or to stack 708.

After network traffic content is transmitted to packet processing module 706, packet processing module 706 processes the network traffic content to determine whether to pass the network traffic content to a user. In the illustrated embodiments, packet processing module 706 is configurable to have different content filtering settings. In such case, packet processing module 706 either blocks or allows content stream to be passed to a user, depending on the content filtering settings of packet processing module 706. For example, packet processing module 706 can scan web and email traffic for undesirable non-program content, such as a key word or a phrase, and blocks the entire message or the particular page that contains the undesirable content when a match is found. Alternatively, or additionally, packet processing module 706 can also send a message notifying a user. In some embodiments, packet processing module 706 may also perform one or more basic functions of a network gateway. For example, packet processing module 706 may include a firewall module that performs stateful inspection. Alternatively, or additionally, packet processing module 706 may also include a decryption module for decrypting incoming network content before transmitting the content to a user. Packet processing module 706 may also be configured to perform other basic or known functions of a network gateway. In alternative embodiments, firewall module and/or decryption module may be implemented as part(s) of processor 24. Those skilled in the art understands that protocol differentiator 704, packet processing module 706, stack 708, fire module, and decryption module may be implemented using hardware, software, or any combination thereof.

As discussed previously, unsafe traffic content are transmitted from protocol differentiator 704 to stack 708. Stack 708 converts the traffic content into content stream such that it can be processed by processor 24. In the illustrated embodiments, as network traffic content are received in stack 708, they may be organized and stored in stack 708 according to their service or protocol type. For example, HTTP stream, FTP stream, and email stream may each be stored in a designated memory slot of stack 708. In alternative embodiments, network traffic content may be stored in stack 708 in accordance with the order in which they are received, according to certain prescribed protocol or traffic shaping rules, or in accordance with other prescribed arrangements.

Next, processor 24 receives network content stream from stack 708 and analyzes the network content to determine if they contain a virus, a worm, a web content, a Trogent agent, an email spam, a packet transmitted by a hacker, or other undesirable content. Particularly, processor 24 may execute one or more functions to determine whether the network traffic content matches content desired to be detected, which is codified by a signature using CPRL, as discussed previously. The operations of processor 24 and memory 22 are described above in reference to FIG. 2. If it is determined that network traffic content matches content desired to be detected, processor 24 or processor 702 may prevent the network traffic content from being sent to a user, send a message to a user, or remove the undesirable portion from the network traffic content before transmitting it to the user. If it is determined that network traffic content does not match content desired to be detected, processor 24 then passes such content to a user. In the illustrated embodiments, processor 24 is configured to pass the content to a user. Alternatively, processor 24 may signal stack 708 or processor 702 to transmit the content to the user.

Figure 8:
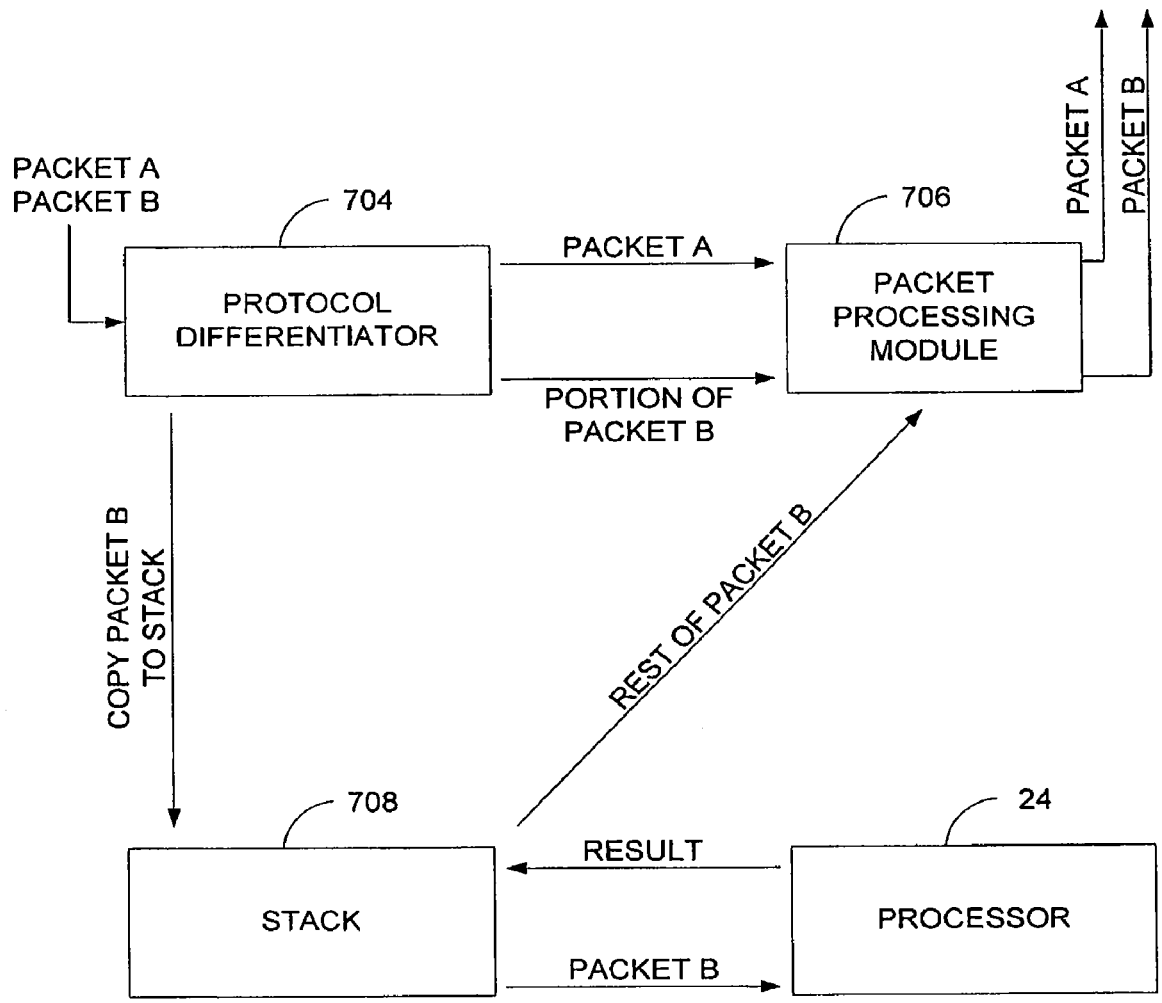
FIG. 8 shows examples of operation that may be performed by components of detection device of FIG. 7.

In the previously described embodiments, network traffic content transmitted to protocol differentiator 704 are either passed to packet processing module 706 or to stack 708. However, this needs not be the case. In alternative embodiments, in addition to traffic content that doesn't need to be processed by processor 24, protocol differentiator 704 may also pass at least a portion of traffic content that needs to be processed by processor 24 to packet processing module 706 (FIG. 8). As shown in FIG. 8, packets A and B are both transmitted to protocol differentiator 704. Based on the file type or protocol of packet A, protocol differentiator 704 determines that packet A does not need to be processed by processor 24. As such, protocol differentiator 704 passes packet A to packet processing module 706, which in turn, scans packet A and passes packet A to a user. On the other hand, based on the file type or protocol of packet B, protocol differentiator 704 determines that packet B is to be processed by processor 24. In such case, protocol differentiator 704 may make a copy of packet B and passes it to stack 708. Protocol differentiator 704 also transmits a portion of packet B to packet processing module 706 where the portion of packet B is temporarily stored, while processor 24 processes packet B to determine if it contains undesirable content. Alternatively, instead of transmitting the portion of packet B to packet processing module 706, protocol differentiator 704 may transmit a portion of packet B to a separate module (not shown), such as a memory, a buffer, or a processor, where the portion of packet B is temporarily stored. In such case, the separate module is configured for storing data ready to be sent to the user. If processor 24 determines that packet B does not contain undesirable content, processor 24 then signals stack 708 to transmit the rest of packet B to packet processing module 706 (or to the separate module if one is provided), which in turn, assembles packet B and passes packet B to the user. On the other hand, if processor 24 determines that packet B contains undesirable content, packet B is not passed to the user. In such case, processor 24 may cause a message to be sent to the user indicating that undesirable content has been detected, remove the undesirable portion from the network traffic content before transmitting to the user, and/or delete the network traffic content in its entirety.

The above described configuration is advantageous in that a packet (e.g., packet B) can be advanced through a traffic stream while it is being examined by processor 24 to determine if it contains undesirable content, thereby improving an efficiency of detection device 700. In alternative embodiments of the invention, instead of having protocol differentiator 704 transmit a copy of packet B to stack 708, packet processing module 706 can be configured to make a copy of packet B and transmit packet B to stack 708.

In the previously described embodiments, protocol differentiator 704 passes a portion of packet B to packet processing module 706 (or to a separate module if one is provided). However this needs not be the case. In alternative embodiments, instead of transmitting a portion of packet B, the entire packet B may be transmitted from protocol differentiator 704 to packet processing module 706. In such case, protocol differentiator 704 may flag packet B (e.g., by modifying a header, adding a header, or inserting data, e.g., a flag data, to packet B) before transmitting packet B to packet processing module 706 (or to buffer). The flag data added to packet B is designed to signal packet processing module 706 not to pass packet B to user until it is determined that packet B is a safe traffic content. Towards this end, signal packet processing module 706 is configured such that it passes non-flagged data and prevents flagged data from being sent to a user. When processor 24 determines that packet B does not contain an undesirable content, processor 24 can then signal packet processing module 706 to pass packet B to user.

Figure 9:
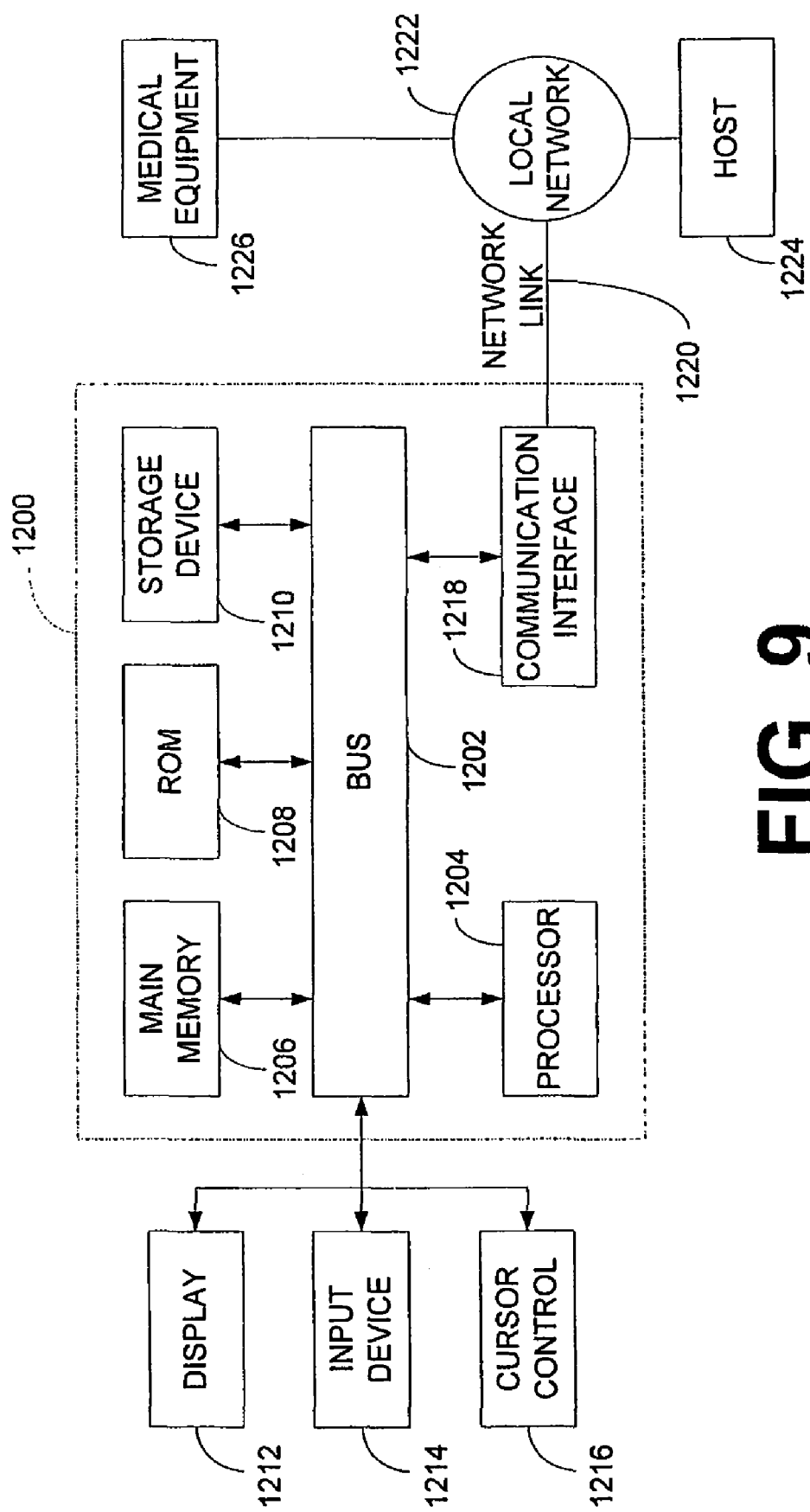
FIG. 9 is a diagram of a computer hardware system with which embodiments of the present invention can be implemented.

Although detection device 10 or 700 has been described as a hardware unit that is configured to be coupled to a user interface, such as a computer, those skilled in the art understand that a computer system may also be used to implement detection device to perform the same or similar functions described herein. FIG. 9 is a block diagram that illustrates an embodiment of a computer system 1200 upon which embodiments of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 may further include a read only memory (ROM) 1208 or other static storage device coupled to bus 1202 for storing static information and instructions for processor 1204. A data storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for processing network traffic content. According to some embodiments of the invention, such use may be provided by computer system 1200 in response to processor 1204 executing one or more sequences of one or more instructions contained in the main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry data streams representing various types of information.

Network link 1220 typically provides data communication through one or more networks to other devices. For example, network link 1220 may provide a connection through local network 1222 to a host computer 1224. The data streams transported over the network link 1220 can comprise electrical, electromagnetic or optical signals. The signals through the various networks and the signals on network link 1220 and through communication interface 1218, which carry data to and from computer system 1200, are exemplary forms of carrier waves transporting the information. Computer system 1200 can send messages and receive data, including program code, through the network(s), network link 1220, and communication interface 1218. Although one network link 1220 is shown, in alternative embodiments, communication interface 1218 can provide coupling to a plurality of network links, each of which connected to one or more local networks. In some embodiments, computer system 1200 may receive data from one network, and transmit the data to another network. Computer system 1200 may process and/or modify the data before transmitting it to another network.

Although the methods and the detection devices have been described with reference to detecting a virus, a worm, a web content, a Trogent agent, an email spam, and a packet transmitted by a hacker, it should be understood that the same or similar methods and devices may also be used to detect other content. Particularly, the predicates described herein, or similar predicates, may also be used to codify other types of content (as defined by a user) that is desired to be detected. In addition, although examples of predicates have been described, in alternative embodiments, other types of predicates, languages, or symbolic models, may be used to create a signature to thereby codify content desired to be detected. Also, the operations performed by processor 14 and processor 702 can be performed by any combination of hardware and software within the scope of the invention, and should not be limited to particular embodiments comprising a particular definition of "processor". Furthermore, it should be noted that the configuration of detection device should not be limited to the examples shown previously, and that detection device may have other configurations as long as it can perform the functions described herein. For example, in some embodiments, the functions performed by processor 24 and processor 702 may be implemented using a single processor. In addition, protocol differentiator 704, packet processing module 706, stack 708, fire module, and decryption module may be implemented in processor 24, processor 702, or another processor, which mayor may not include a memory unit.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. The specification and drawings are, accordingly, to be regarded in an illustrative rather than restrictive sense. The present inventions are intended to cover alternatives, modifications, and equivalents, which may be included within the spirit and scope of the present inventions as defined by the claims.

Breakdown by Predicate Type

| Test | 12 predicates |
|---|---|
| Pointer | 3 Predicates |
| Decision | 3 Predicates |
| Iteration | 3 Predicates |
| Function | 3 Predicates |

Predicate Format

Each primary predicate letter in CPRL has a corresponding mnemonic form. Some also have alternate (or alias) forms. For example F is the predicate letter for FIND as in:

B(m)=Bitmask(mask). Alternate form could be mask (mask) or nibble(mask).

Pointer Resolution

Pointer resolution is a critical issue in developing CRPL. This involves the position of two pointers. The first is the pointer to the current position in the buffer. The second is the pointer to the current position in the signature. The design specification of each and every predicate is unambiguous about where each pointer is located after completion. Moreover, the position for each of the pointers may be specified for each possible condition returned by the predicate (i.e. true, false, etc.).

TABLE 2

Hex Values Assigned to Predicate Letters
Table 2 below shows the extended function code assigned to predicate letters. Note that each letter has 10 (0x0A) usable code values assigned to it. This code values is the byte that follows the 0xDF (extended) byte that tells the interpreter that it is now dealing with a CPRL predicate. Example A ("vermin") would become DF 00 76 65 72 6D 69 6E where the second byte (00) represents the A predicate letter.

| A ascii | 00/0x00 | |
|---|---|---|
| B bitmask | 10/0x0A | 0A = get/push mask; 0B = pop/cmp mask; simple not extended. |

Appendix A

Exemplary Specifications for Predicates

TABLE 1

Predicate Letter Summary
Alphabetical list of predicate letters with details

| ID | Return | Predicate | Mnemonic | Family | Description |
|---|---|---|---|---|---|
| A | b | A(z) | Ascii | Test | Test literal string |
| B | b | B(m) | Bitmask | Test | Test using bitmask |
| C | V | C( ) | Case | Decision | Branch using multiple cases |
| D | V | D(label) | Do | Iteration | Start Loop (ends on lable) |
| E | V | E(f, b, b . . . ) | Each | Iteration | Repeat function with each byte in list |
| F | V | F(n, f) | For | Iteration | Repeat function on n buffer bytes |
| G | V | G (label) | Goto | Decision | Goto label in sig |
| H | B | H(d) | Heuristic | Test | Test d against heuristic flags |
| I | V | I(f, l) | If | Decision | If test f branch else continue |
| J | V | J(size) | Jump | Pointer | Jump using buffer value of size |
| K | B | K(reserved) | Keyword | Function | Process keyword |
| L | B | L(b) | Literal | Test | Test literal |
| M | V | M(name) | Macro | Function | Execute macro NAME |
| N | B | N(logic) | Near | Test | Test using relative logic |
| O | B | O(n, method) | Order | Test | Order (sort) n buffer bytes using method |
| P | V | P(name) | Process/Procedure | Function | Execute process name |
| Q | B | Q(logic) | Query | Test | Test using ranged logic |
| R | V | R(p) | Rewind | Pointer | Reset buffer stream pointer |
| S | B | S (n, k) | Seek | Pointer | Reposition buffer stream pointer |
| T | B | T(logic) | Test | Test | Test using positional logic |
| U | b | U(z) | Uppercase | Test | Test after uppercasing buffer string |
| V | b | V(logic) | Variable | Test | Test using set summation |
| W | b | W(c) | Wildcard | Test | Simply (one byte) wildcards |
| X | b | X(b) | Xray/Xor | Test | Test using xor mask based on b |

TABLE 2-continued

Hex Values Assigned to Predicate Letters
Table 2 below shows the extended function code assigned to predicate letters. Note that each letter has 10 (0x0A) usable code values assigned to it. This code values is the byte that follows the 0xDF (extended) byte that tells the interpreter that it is now dealing with a CPRL predicate. Example A ("vermin") would become DF 00 76 65 72 6D 69 6E where the second byte (00) represents the A predicate letter.

| | | |
|---|---|---|
| C case | 20/0x14 | |
| D do | 30/0x1E | |
| E each | 40/0x28 | |
| F for | 50/0x32 | |
| G goto | 60/0x3C | |
| H heuristic | 70/0x46 | |
| I if | 80/0x50 | |
| J jump | 90/0x5A | |
| K keyword | 100/0x64 | |
| L literal | 110/0x6E | |
| M macro | 120/0x78 | |
| N near | 130/0x82 | 82 = byt; 83 = word |
| O rder | 140/0x8C | |
| P process | 150/0x96 | |
| Q query | 160/0xA0 | A0 = byte; A1 = word |
| R rewind | 170/0xAA | |
| S seek | 180/0xB4 | See section on S Predicate overload |
| T test | 190/0xBE | BE = byte; BF = word |
| U uppercase | 200/0xC8 | |
| V variable | 210/0xD2 | |
| W wildcard | 220/0xDC | |
| X xor | 230/0xE6 | |

Predicate Letter Descriptions

Note that any given predicate may have 2 or more forms. Descriptions may have the following format.

| Mnemonic and Predicate | |
|---|---|
| Group | Boolean, Test, Logic/Math, Flow/Branch, |
| Types | MZ, PE, etc |
| Alias(es) | Alternate forms of predicate mnemonic. |
| Arguments | Values defining the predicate usage. |
| Returns | Result of predicate action (boolean, pointer, etc.) |
| Hex Pattern | Hexadecimal encoding of predicate letter. |
| Sig Pointer Resolution | Default location of sig pointer after action. |
| Buffer Pointer Resolution | Default location of buffer pointer after action. |
| Logic and Flow | Flowchart of logic. |
| Explanation | Details of predicate function. |
| Example | Example in predicate and resultant hexadecimal forms. |
| Compiler Notes | Notes on testing, validating, and compiling predicate. |

A-ASCII (See Also Uppercase)

The A predicate is used to compare text strings. It may allow for escape sequences as found in C, such as "\n" for new line. The strings may be included in quotation marks.

Note that the first argument in an A predicate may be the number of bytes in the stream. This is calculated and stored by the compiler.

| | |
|---|---|
| Mnemonic and Predicate | Ascii - A( ) |
| Group | Test |
| Types | Any |
| Alias(es) | String( ) |
| Arguments | A string literal in C format allowing for escape sequences. |
| Returns | True on matching all characters, otherwise false. |
| Hex Pattern | Hexadecimal encoding of predicate letter. |
| Sig Pointer Resolution | If true or false, point to byte following string literal in sig. |
| Buffer Pointer Resolution | If true, point to byte following string literal in buffer, else reset pointer to start of tested string literal in buffer. |
| Logic and Flow | Function like strcmp. Compare each byte in sig to each byte in buffer in sequence. Testing is case sensitive. Returns true if all chars in string literal and buffer match. |
| Examples | A("Another K00L virus") A("Warning!\n You are infected!") |

Predicate Format

| | |
|---|---|
| DF 00 | A("string") |
| DF 01 | A(byte range, "string") |
| DF 02 | A(long start offset, long range, string) |
| DF 03 | A(ALL, "string") |
| DF 04 | A(long range, "string") |

Description

DF 00 takes 1 argument: a string literal. It matches a string that starts at the current location.

DF 01 takes 2 arguments: an unsigned byte value (range) and a string literal. It searches from the current buffer pointer location for the first occurrence of the string literal within range, where range is the distance to look for the first byte in the string literal. Other chars in the string literal may be beyond range if the first char is within range.

DF 02 takes 3 arguments: an unsigned long value (start offset), an unsigned long value (range), and a string literal. It searches from the provided start offset for the first occurrence of the string literal within range, where range is the distance to look for the first byte in the string literal. Other chars in the string literal may be beyond range if the first char is within range.

DF 03 takes two arguments, the keyword ALL, and a string literal. It searches the entire buffer from the start looking for the first occurrence of the string literal.

DF 04 takes 2 arguments: an unsigned long value (range) and a string literal. It searches from the current buffer pointer location for the first occurrence of the string literal within range, where range is the distance to look for the first byte in the string literal. Other chars in the string literal may be beyond range if the first char is within range.

B—Bitmask

The bitmask predicate has three forms. The first is B(mask, byte) that simply applies the mask to the next byte in the buffer and compares it to byte. This becomes the wildcard 0xDE.

The other two may work in conjunction and are used in register matching.

The first is B(GET, REG), which gets the next byte in the buffer and used REG as a mask to extract the register bits. The resultant byte is stored in REG=OP format (explained below) by pushing it onto the registry stack.

The second is B(CMP,REG), which pops the registry mask byte off the registry stack, puts it into REG format and compares it to the next byte in the buffer.

There are three REG formats. OP (the registry bits in a single byte instruction), RG (the reg bits in a mod/rm byte), and RM (the r/m bits in a mod/rm byte).

| | |
|---|---|
| Mnemonic and Predicate | BITMASK - B( ) |
| Group | test |
| Types | binary |
| Alias(es) | nibble (0xDE form) |
| Arguments | 2 |
| Returns | true or false |
| Hex Patterns | B(mask, byte) is 0xDE (simple mask)<br>B(GET, REG) is 0xDF, 0x0A<br>B(CMP, REG) is 0xDF, 0x0B |
| Sig Pointer Resolution | next predicate |
| Buffer Pointer Resolution | next buffer byte |
| Logic and Flow | B(mask, byte) AND buffer byte with mask. Compare byte.<br>B(GET, REG) get byte, isolate registry bits, push on stack.<br>B(CMP, REG) pop bitmask from stack, use as registry mask. |

C—Case (See Also If)

The C predicate functions by comparing the next byte in the buffer with a series of bytes. Each byte in the series is followed by a label byte. If any byte matches, the signature pointer moves to the related label in the sig.

In pseudocode this would appear as:

```
C(0E,@1,8E,@2,CD,@3), END or sig continues for no match then END
@1: sig for case 0E.........END
@2: sig for case 8E.........END
@3: sig for case CD........END
``` where @1 etc are labels and END means stop comparing.

G—Goto

The G predicate is simply a forward reference that instructs the interpreter to move the signature pointer to a new location. The argument is a specified label. This function is used to skip a segment of the signature. It is used in relation to an I predicate to end the else section and therefore functions as a break command.

Note on Labels: A label is not actually stored in a signature. Rather a forward reference is stored in the calling predicate. The forward reference may be an unsigned byte, which equals the number to add to the signature pointer in order to arrive at the first instruction after the label in the pseudocode.

Note that Goto uses a system of forward referencing jump points and landing points. So as to not restrict the length of signatures, these values are unsigned shorts.

Summary

The G predicate functions as a break or continue statement. It repositions the signature pointer and has no effect on the buffer pointer.

Predicate Format

| | |
|---|---|
| DF 3C | G(L1) |
| DF 3D | G(true) |
| DF 3E | G(false) |
| DF 3F | G(fuzzy) |

Description

The G predicate takes a single argument. The argument is a label token (such as L1). This label token has a corresponding label (such as L1:). After the predicate is interpreted the signature pointer is set to the offset of L1:

In addition to a label token, the G predicate can also take two other tokens that are used to terminate the signature completely:

| | |
|---|---|
| G(TRUE) | to signify that a we have found a match |
| G(FALSE) | to signify that a we have not found a match |

I—If (See Also Case)

The I predicate takes two arguments. A byte to compare and a label. It functions by comparing the next byte in the buffer with a argument byte. If the bytes match then the sig pointer is moved to the label location and processing continues. If the bytes do not match processing continues from the current signature location:

In pseudocode this would appear as:

```
I(0E,@1)
   continue sig comparison as if an else statement. END
   @1: continue sig for the 0E match.
```

J—Jump

The J predicate takes a single argument. It is used where a jump or call instruction in the buffer needs to be followed to its landing point. The argument indicates what bytes to use to calculate the landing point. The possible arguments are BYTE, WORD, and DWORD. Depending on the argument, the next one, two, or four bytes are used to calculate the landing point.

Note that the bytes will be in Intel format and may be so calculated.

Note also that all calculated values may be treated as signed values to permit moving to a relative location before or after the current buffer position.

L—Literal

The L predicate is used to encapsulate any literal byte stream. Note that values in this byte stream with a value from 0xD8 to 0xDF may be either:

inside an embedded L(byte) predicate (if the value is needed for detection), or replaced by an embedded W(1) (which simply replaces it with a 0xD8 wildcard)

Note that the first argument in an L predicate may be the number of bytes in the stream. This is calculated and stored by the compiler.

R—Rewind (See Also Seek)

The R predicate takes a single argument. The argument is a byte that represents an unsigned offset. The R predicate moves the pointer to the start location in the buffer (where the signature testing began, usually the code entry point). The argument is an optional offset from that start location. Note that R(0) translates to the one byte wild card 0xDB and sets the pointer at the exact start location.

S—Seek (See Also Rewind)

The S predicate functions like the fseek function. It takes two arguments, the first is a signed long offset that indicates the distance to move within the buffer. The second is a keyword that indicates the start location. The keywords are the same as in C:

| | |
|---|---|
| SEEK_SET (0) | From beginning of buffer. |
| SEEK_CUR (1) | From current location (relative) |
| SEEK_END (2) | From end of file. |

To simplify matters, these keywords are not case sensitive and within the predicate can be truncated to SET, CUR, and END. A negative offset used with SEEK_SET may generate an error. A positive offset used with SEEK_END is interpreted the same as a negative value so that:

S(2000, SEEK_END)=S(−2000, SEEK_END).

Values calculated with SEEK_CUR are treated as relative sighed values.

U—Uppercase (See Also ASCII)

The U predicate is used to compare text strings. Like the A predicate, it may allow for escape sequences as found in C, such as "\n" for new line. The strings may be included in quotation marks. The test string to be used may be input in all uppercase. If any chars in the test string are lower case, the compiler may uppercase them.

The predicate differs from the A predicate in that it is actually eliminates case-sensitivity. When a letter (in either case) is found that matches the first letter of the test string, each letter in the buffer is uppercased by the interpreter and compared to the corresponding letter in the test string.

Note that the first argument in a U predicate may be the number of bytes in the stream. This is calculated and stored by the compiler.

V—Variable

The V predicate counts matches for one or more test bytes within a specified range. The first argument is a keyword that specifies the test method to apply. The second byte is a benchmark value to test against. The third argument is the range of bytes. These are followed by one or more test bytes to match. In the compiled version of the signature, the fourth argument is the number of test bytes to match, which is calculated and stored by the compiler. The count is followed by the actual test byte(s).

The methods are represented by three separate extended (0xDF) functions:

| | | |
|---|---|---|
| EQ (0xD2) | true if count = benchmark. |
| GT (0xD3) | true if count > benchmark. |
| LT (0xD4) | true if count < benchmark. |

So if method=0, benchmark=8, range=32 (0x20) and the test bytes are 0xCD, 0xBE, and 0x21 then:

the predicate form would be V(EQ, 8, 32, 0xCD, 0xBE, 0x21), which translates to DF D2 08 20 03 CD BE 21 where the count 03 is added by the compiler.

W—Wildcard

The W predicate is used to represent the simple "skip" and slide wildcards.

W(1)=skip(1) and translates 0xD8 and ignores 1 byte
W(2)=skip(2) and translates 0xD9 and ignores 2 bytes
W(n)=skip(n) and translates 0xDA, n and ignores n bytes
W(n, b)=slide(n) and translates 0xDB, n, byte and searches n bytes for a byte matching b.

N, Q, T—Predicates

There are 3 logic predicates. Test, Near, and Query.

Test tests the next one or two bytes (depending on the logic).

Near tests bytes within (plus or minus) 127 bytes of the current buffer position.

Query tests bytes in the next 255 bytes of the current buffer position.

Each predicate takes an initial argument that represents the type of logic to apply in the test. The logic argument is followed by a variable number of other arguments. In Near and Query logic, the second argument is the range to search within the buffer. In Near logic the range is a signed byte (−128 to 127). In Query logic the range is an unsigned byte (0 to 255).

There are ten (10) logical operators. Each is represented in CPRL by a keyword. These keywords are not case sensitive. These keywords are reserved, so they can be used in a logic predicate or else in a quote (such as finding the word "and" in a byte stream).

There are four (4) primary logical keywords. These are AND, XOR, OR, and NOT. These four keywords can be used with any logic predicate.

There are six (6) additional keywords. These are NEG, POS, NZ, MOD, BIT, and REG. These six may be used with the Test predicate. They may be applied to the next byte in the buffer.

T(AND) may require 2 byte arguments and tests the next two bytes in the buffer.

T(XOR) may require 2 byte arguments and tests the next two bytes in the buffer.

T(OR) may require a list of 2 or more bytes and tests the next byte in the buffer.

T(NOT) may require a list of 1 or more bytes and tests the next byte in the buffer.

T(NEG) has no arguments. It returns true if the next byte in the buffer is negative.

T(POS) has no arguments. It returns true if the next byte in the buffer is positive.

T(NZ) has no arguments. It returns true if the next byte in the buffer is non-zero.

T(MOD) may require 2 byte argument, a divisor and mod to match.

T(BIT) may require 1 byte argument, a bitmask.

T(REG) may require 1 byte argument, a registry mask.

N(AND) may require a signed range byte and list of 2 or more test bytes.

N(XOR) may require a signed range byte and 2 test bytes.

N(OR) may require a signed range byte and list of 2 or more test bytes.

N(NOT) may require a signed range byte and list of 1 or more test bytes.

Q(AND) may require an unsigned range byte and list of 2 or more test bytes.

Q(XOR) may require an unsigned range byte and 2 test bytes.

Q(OR) may require an unsigned range byte and list of 2 or more test bytes.

Q(NOT) may require an unsigned range byte and list of 1 or more test bytes.

TABLE 3

Hex Valu s Assigned to Logical Operators
The following table gives the byte value assigned to each logical operator. This byte is used as the first argument in one of the logic predicate letters (T, N, Q).

| | |
|---|---|
| AND | 0 |
| XOR | 1 |
| OR | 2 |
| NOT | 3 |
| NEG | 4 |
| POS | 5 |
| NZ | 6 |
| MOD | 7 |
| BIT | 8 |
| REG | 9 |

For example T(or, 0xBB, 0xBF) translates to DF BE 02 BB BF. Where BE represents the T predicate letter and 02 represents the OR logical operator. This predicate would return true if the next letter in the buffer is either 0xBB or 0xBF.

Byte Stream Format

For input of literal byte streams, the individual bytes in the stream are not delimited by commas. The normal form of a literal byte stream is a simply hexadecimal form.

While a "solid" stream

L(DE83FFCD21B40AEB0005C3)

is traditional, a "broken" stream

L(DE 83 FF CD 21 B4 0A EB 00 05 C3)

is much easier to work with in actual practice.

In either case, each byte may be represented by two characters, even is a value is less than 10 hex.

56 78 01 DF 00 correct 56 78 1 DF 0 wrong

Virus Name

The virus name location can remain consistent with the previous FortiNet, in that the name can precede the signature along with other flags such as signature type.

Suggested Input Format

It is easiest in practice to input a signature by placing a single predicate on each line along with comments. Here is a simple example:

```
"W32/Virus_Name.A"
Win32
L(EB DF 01 00 00)        // Match bytes in far call
R(-4)                    // Move buffer pointer back to start of call word
J(LONG)                  // Follow jump to landing point
L(EB 00 00 00 00 1E)     // literal
W(1)                     // skip byte
B4 00 8C C8 CD 13)       // literal
W(5)                     // skip next 5 bytes
L(50 67 88 D1 AC)        // literal
```

The name and signature may be stored in a standard format, such as:

Full length (name+signature), length of name, name, 0, info flags, signature byte stream When compiling a byte stream the compile may reconstruct each byte while ignoring any space characters).

Example of Polymorphic

Accurate detection of the Tequila virus may require a specific algorithm, which is given directly below in pseudocode.

Code

```
Seek 68 (0x44) bytes back from end of file. This is the base point.
If byte at this location is either 0x0E or 0x8C then continue else return false.
If 0x0E then go to label L1:
(First byte was 0x8C) If next is 0xCB then continue at label L2: else return false.
L1:
(First byte was 0x0E) If any of next 4 bytes is 0x1F continue else return false.
L2:
Reset pointer to base point.
If 0x60 is found in the first 24 bytes then continue else return false.
If byte immediately following 0x60 is 0x09 then continue else return false.
Return true.
```

Tequila using a logical OR test and If predicate as in pseudo code above.

```
S(68,SEEK_END)    // Seek 68 (44h) bytes from eof
T(OR, 0E, 8C)     // Test first byte for 0E or 8C (increments sig ptr)
R(0)              // Reset pointer to first byte
I(0E, L1)         // IF 0E go to label L1 (test does not increment sig ptr)
L(8C, CB)         // Else test for CB [could skip(1) and use L(CB)]
G(L2)             // go to label L2
L1:               // do if first byte was 0E
W(5, 1F)          // search from sig base to locate 0x1F
L2:               // do for either match at start
R(0)              // reset under both conditions (0E or 8C)
W(24, 60)         // search 24d bytes for 60h)
L(09)             // test byte for 09h
```

Here's Tequila using the Case predicate instead of the OR/If combo.

```
S(68,SEEK_END)        // Seek 68 bytes from eof
C(0E, L1, 8C, L2)     // Case test first byte for 0E or 8C
L1:                   // 0E
W(4, 1F)              // search four bytes for 0x1F
G(L3)                 // go to label L3
L2:                   // 8C
L(CB)                 // test next byte for CB
L3:                   // continue for both
R(0)                  // reset under both conditions (0E or 8C)
W(24, 60)             // search 24d bytes for 60h
L(09)                 // test next byte after 60h for 09
```

Enhancement to the CPRL

Introduction

CPRL is Fortinet's content pattern recognition language, it was originally designed to provide a flexible way to represent computer virus signatures. To make the best use of Fortinet's proprietary content scan technology (URL scan and keyword scan), it may be desirable to enhance CPRL to include more features than the original predicates, so that text patterns (English or foreign) can be represented using the same language. The benefit of doing so is to produce a unified language interface so that it can be implemented efficiently both by software codes and by hardware ASIC design.

To make it easy to understand, the enhancement of CPRL uses syntax similar to Regular Expression. The enhancement takes the form of a new predicates FRX( . . . ), which stands for Fortinet Regular Expression, syntax as follows:

Grammar

```
1. Single Character Metacharacters
.            matches any one character
[...]        matches any characters listed between the brackets
[^...]       matches any character except those listed between the brackets
2. Quantifiers
?            matches any character zero or one time
*            matches the preceding element zero or more times
+            matches the preceding element one or more times
{num}        matches the preceding element num times
{min,max}    matches the preceding elelment betwen min and max times
3. anchors
^            matches at the start of the line
$            matches at the end of the line
4. Escape characters
\            Escape
5. Logical operators
|            logical OR
```

EXAMPLES

```
FRX("badsite\.com")
    matches exact string 'badsite.com'
FRX("badsite[0-9]\.com")
    Matches badsite followed by a number and then '.com', for example
'badsite1.com', 'badsite2.com', etc.
FRX("badsite[s]?\.com")
    Matches 'badsite.com' or 'badsites.com'.
FRX("badsite\.com$")
    Matches any string that end with 'badsite.com', such as
    'www.badsite.com',
'ftp.badsite.com', etc.
FRX("(bad|worse)site\.com")
    Matches 'badsite.com' or 'worsesite.com'.
```

The invention claimed is:

1. A device for managing network traffic flow, the device comprising:
   a first processor, the first processor configured to
      receive network traffic content into a protocol differentiator,
      pass a first portion of the network traffic content from the protocol differentiator downstream, and
      pass a second portion of the network traffic content from the protocol differentiator to:
         a stack for allowing the second portion to be scanned for content that is desired to be detected; and
         a packet processing module that performs content filtering on the second portion and awaits an instruction before passing the second portion further downstream;
   a second processor that is configured to scan the second portion for the content desired to be detected and provide the instruction to the packet processing module to pass the second portion further downstream based on a determination with regard to the scanning of the second portion for the content desired to be detected; and
   wherein the protocol differentiator passes the first portion of the network traffic content downstream without regard to the scanning by the second processor of the second portion for the content desired to be detected.

2. The device of claim 1, wherein the first or the second processor is further configured to pass the second portion downstream after the second portion is scanned.

3. The device of claim 1, wherein the first portion of the network traffic content is not scanned for the content that is desired to be detected.

4. The device of claim 1, wherein the network traffic content being detected is undesirable content.

5. The device of claim 1, wherein the first processor is further configured to compare a port over which the network traffic content was received with preassigned ports to determine the type of content received.

6. The device of claim 1, wherein at least one of the first and second processors are configured to scan data on a plurality of ports to determine a type of the network traffic content received.

7. The device of claim 1, wherein at least one of the first processor and the second processor are configured to decrypt the network traffic content.

8. A method comprising:
   on a first processor:
      receiving network traffic content into a protocol differentiator,
      passing a first portion of the network traffic content from the protocol differentiator downstream, and
      passing a second portion of the network traffic content from the protocol differentiator to:
         a stack for allowing the second portion to be scanned for content that is desired to be detected; and
         a packet processing module that performs content filtering on the second portion and awaits an instruction before passing the second portion further downstream; and
   on a second processor:
      scanning the second portion for the content desired to be detected;
      performing a further action as a function of the result of the scanning of the second portion, the further action including sending of the instruction to the packet processing module to pass the second portion downstream; and
   wherein the protocol differentiator passes the first portion of the network traffic content downstream without regard to the scanning by the second processor of the second portion for the content desired to be detected.

9. The method of claim 8, wherein the further action includes passing the second portion downstream by the second processor after the second portion is scanned.

10. The method of claim 8, wherein the first portion of the network traffic content is not scanned for the content that is desired to be detected.

11. The method of claim 8, wherein the network traffic content being detected is undesirable content.

12. The method of claim 8, further on the first processor:
   comparing a port over which the network traffic content was received with preassigned ports to determine the type of content received.

13. The method of claim 8, further on one or both of the first and second processors:
   scanning data on a plurality of ports to determine a type of the network traffic content received.

14. The method of claim 8, further on one or both of the first and second processors:
   decrypting the network traffic content.

* * * * *